(12) United States Patent
Oohashi et al.

(10) Patent No.: US 7,570,488 B2
(45) Date of Patent: Aug. 4, 2009

(54) ALTERNATOR RECTIFIER

(75) Inventors: Atsushi Oohashi, Tokyo (JP); Masaki Katoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 301 days.

(21) Appl. No.: 10/573,199

(22) PCT Filed: Sep. 21, 2004

(86) PCT No.: PCT/JP2004/013748
§ 371 (c)(1),
(2), (4) Date: Mar. 24, 2006

(87) PCT Pub. No.: WO2006/033136
PCT Pub. Date: Mar. 30, 2006

(65) Prior Publication Data
US 2007/0040531 A1    Feb. 22, 2007

(51) Int. Cl.
*H05K 7/20* (2006.01)
*H02K 9/06* (2006.01)
*H02K 11/04* (2006.01)
*H02K 5/18* (2006.01)

(52) U.S. Cl. .......... 361/694; 361/695; 361/697; 361/702; 310/62; 310/64; 310/60 R; 310/68 D (58) Field of Classification Search .......... 361/702, 361/690, 692, 694, 695, 697; 310/68, 90, 310/227, 58, 59, 62, 64, 60 R, 68 D
See application file for complete search history.

(56) References Cited

U.S. PATENT DOCUMENTS

| | | | | |
|---|---|---|---|---|
| 6,184,600 B1 * | 2/2001 | Asao et al. | .......... | 310/64 |
| 6,198,187 B1 * | 3/2001 | Asao et al. | .......... | 310/68 D |
| 6,373,163 B1 * | 4/2002 | Oohashi et al. | .......... | 310/198 |
| 6,538,352 B2 * | 3/2003 | Asao | .......... | 310/68 D |
| 6,717,317 B2 * | 4/2004 | Akita et al. | .......... | 310/184 |
| 6,740,995 B2 * | 5/2004 | Oohashi et al. | .......... | 310/68 D |
| 6,856,052 B2 * | 2/2005 | Tamura et al. | .......... | 310/45 |
| 6,867,528 B2 * | 3/2005 | Inoue et al. | .......... | 310/239 |
| 6,933,652 B2 * | 8/2005 | Higashino et al. | .......... | 310/260 |
| 2002/0043885 A1 * | 4/2002 | Asao et al. | .......... | 310/90 |
| 2002/0050750 A1 * | 5/2002 | Oohashi et al. | .......... | 310/68 D |
| 2002/0093270 A1 * | 7/2002 | Oohashi et al. | .......... | 310/254 |
| 2002/0130563 A1 * | 9/2002 | Oohashi et al. | .......... | 310/45 |
| 2002/0130582 A1 * | 9/2002 | Oketani et al. | .......... | 310/216 |
| 2002/0145356 A1 * | 10/2002 | Akita et al. | .......... | 310/184 |

(Continued)

FOREIGN PATENT DOCUMENTS

EP        1615316 A1 *  1/2006

(Continued)

*Primary Examiner*—Anatoly Vortman
(74) *Attorney, Agent, or Firm*—Sughrue Mion, PLLC (57) ABSTRACT

An automotive alternator rectifier including a terminal connection portion configured by connecting a terminal leading out of first unidirectional conducting element bodies disposed on a surface of a first heat sink so as to be spaced apart or a terminal leading out of second unidirectional conducting element bodies disposed on a surface of a second heat sink so as to be spaced apart with a circuit board terminal is disposed between a rotor and a circuit board. For this reason, temperature increases in the first unidirectional conducting element bodies and the second unidirectional conducting element bodies can be suppressed and workability when connecting the terminal connection portion is improved.

10 Claims, 5 Drawing Sheets

U.S. PATENT DOCUMENTS

2003/0015928 A1 * 1/2003 Asao .................... 310/68 D
2003/0048035 A1 * 3/2003 Oohashi et al. ............ 310/263

FOREIGN PATENT DOCUMENTS

| JP | 08331817 A | * | 12/1996 |
| JP | 2001333558 A | * | 11/2001 |
| JP | 2002-153030 A | | 5/2002 |

* cited by examiner

ALTERNATOR RECTIFIER

TECHNICAL FIELD

The present invention relates to an alternator rectifier for converting alternating current generated in a stator into direct current in an automotive alternator mounted to a vehicle, for example.

BACKGROUND ART

Examples of known conventional automotive alternators include automotive alternators including: a case; a rotor disposed inside the case, the rotor being fixed to a shaft and having a fan on an end portion; a stator disposed so as to surround the rotor, an alternating current being generated in the stator by a rotating magnetic field from the rotor; and a rectifier disposed near an end portion of the shaft, the rectifier rectifying the alternating current which is generated by the stator, wherein the rectifier includes: a first heat sink; first unidirectional conducting element bodies disposed on a front surface of the first heat sink so as to be spaced apart; a second heat sink disposed radially outside the first heat sink; second unidirectional conducting element bodies disposed on the second heat sink so as to be spaced apart; and a circuit board having circuit board terminals for connecting the first unidirectional conducting element bodies and the second unidirectional conducting element bodies so as to constitute a bridge circuit (See Patent Literature 1, for example).

In such configurations, terminal connection portions configured by connecting terminals leading out of the first unidirectional conducting element bodies and terminals leading out of the second unidirectional conducting element bodies with the circuit board terminals are disposed between the circuit board and the first unidirectional conducting element bodies and between the circuit board and the second unidirectional conducting element bodies, respectively.

Patent Literature 1

Japanese Patent Laid-Open No. 2002-153030 (Gazette)

In conventional automotive alternator rectifiers, since the respective terminal connection portions between the terminals of the first unidirectional conducting element bodies and the circuit board terminals and between the terminals of the second unidirectional conducting element bodies and the circuit board terminals are on an opposite side from the fan, only a small cooling airflow passes through and one problem has been that temperature increases in the first unidirectional conducting element bodies and the second unidirectional conducting element bodies are large.

Another problem has been that the terminal connection portions are in narrow spaces between the circuit board near the rotor and the first unidirectional conducting element bodies and between the circuit board near the rotor and the second unidirectional conducting element bodies, making workability when connecting the terminal connection portions poor.

DISCLOSURE OF INVENTION

The present invention aims to solve the above problems and an object of the present invention is to provide an alternator rectifier enabling temperature increases in first unidirectional conducting element bodies and second unidirectional conducting element bodies to be suppressed and improving workability when connecting a connection portion, etc.

In order to achieve the above object, according to one aspect of the present invention, there is provided an alternator rectifier including a terminal connection portion configured by connecting a terminal leading out of first unidirectional conducting element bodies and a terminal leading out of second unidirectional conducting element bodies respectively with a circuit board terminal is disposed between a rotor and a circuit board.

In an alternator rectifier according to the present invention, temperature increases in the first unidirectional conducting element bodies and the second unidirectional conducting element bodies can be suppressed and workability when connecting the terminal connection portion is improved.

BEST MODE FOR CARRYING OUT THE INVENTION

Preferred embodiments of the present invention will now be explained based on the drawings, and identical or corresponding members and portions in the drawings will be given identical numbering.

Embodiment 1

Figure 1:
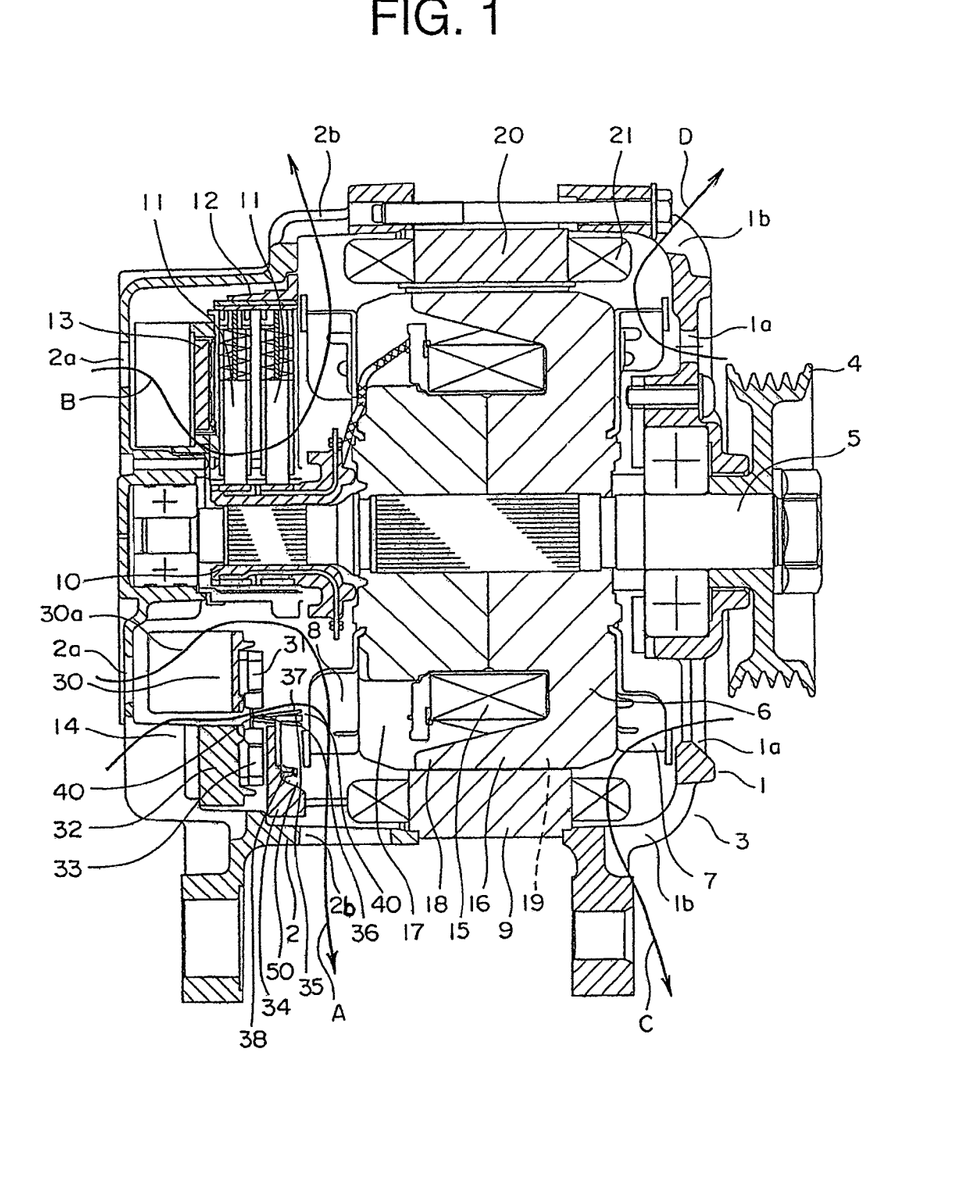
FIG. 1 is a cross section of an automotive alternator according to Embodiment 1 of the present invention is installed.
Figure 2:
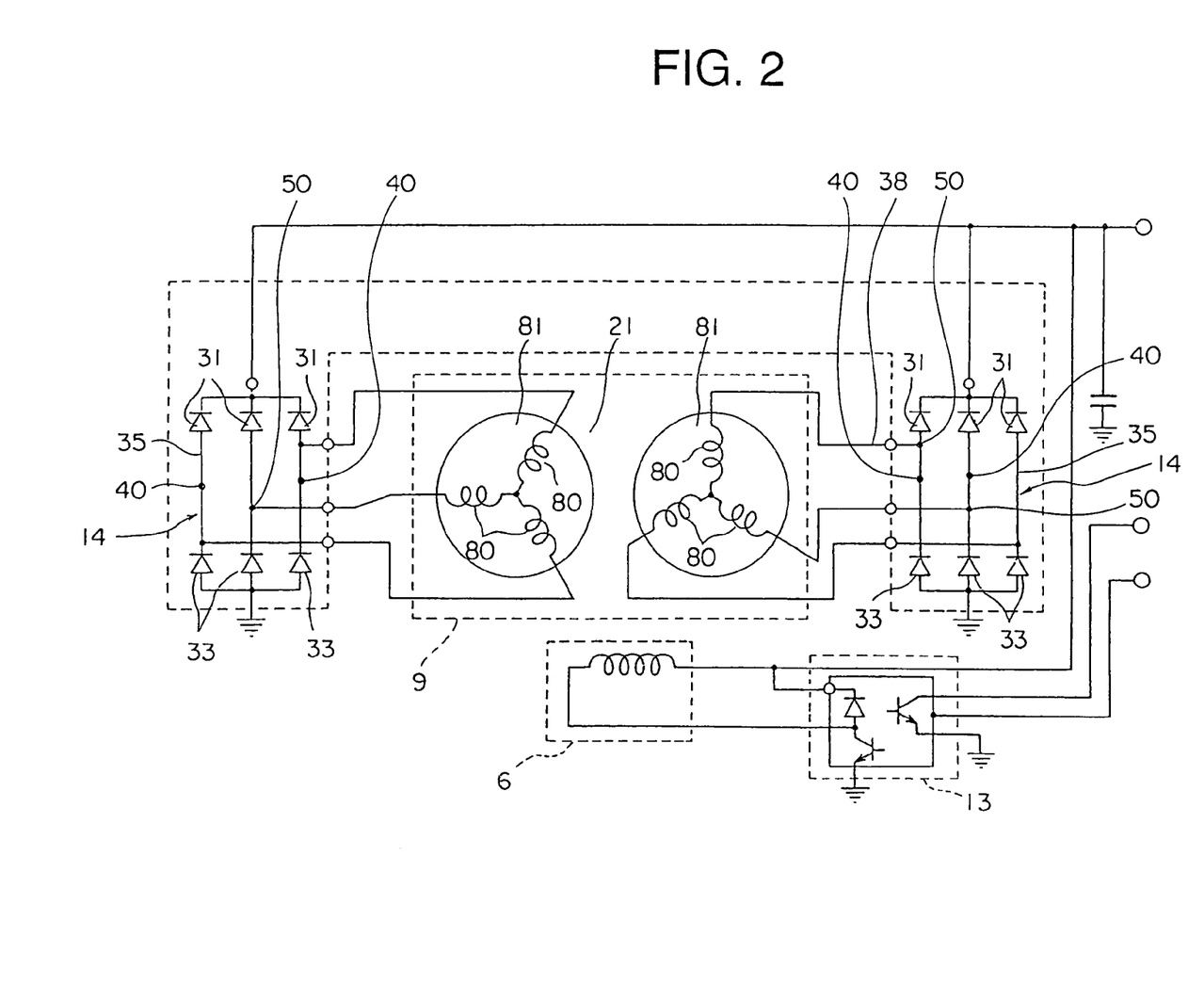
FIG. 2 is an electrical circuit diagram for the automotive alternator in FIG. 1.
Figure 3:
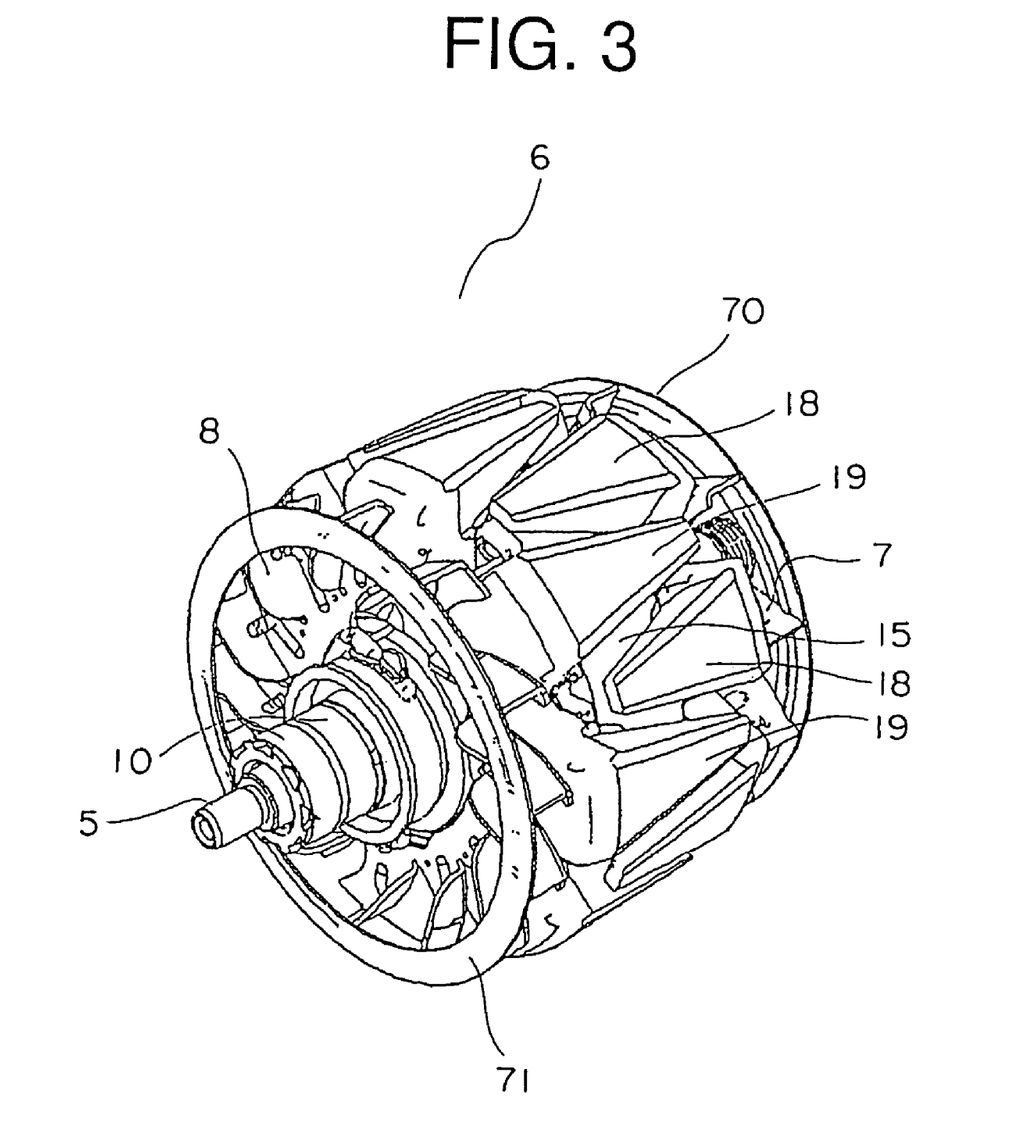
FIG. 3 is a perspective showing a rotor from FIG. 1.
Figure 4:
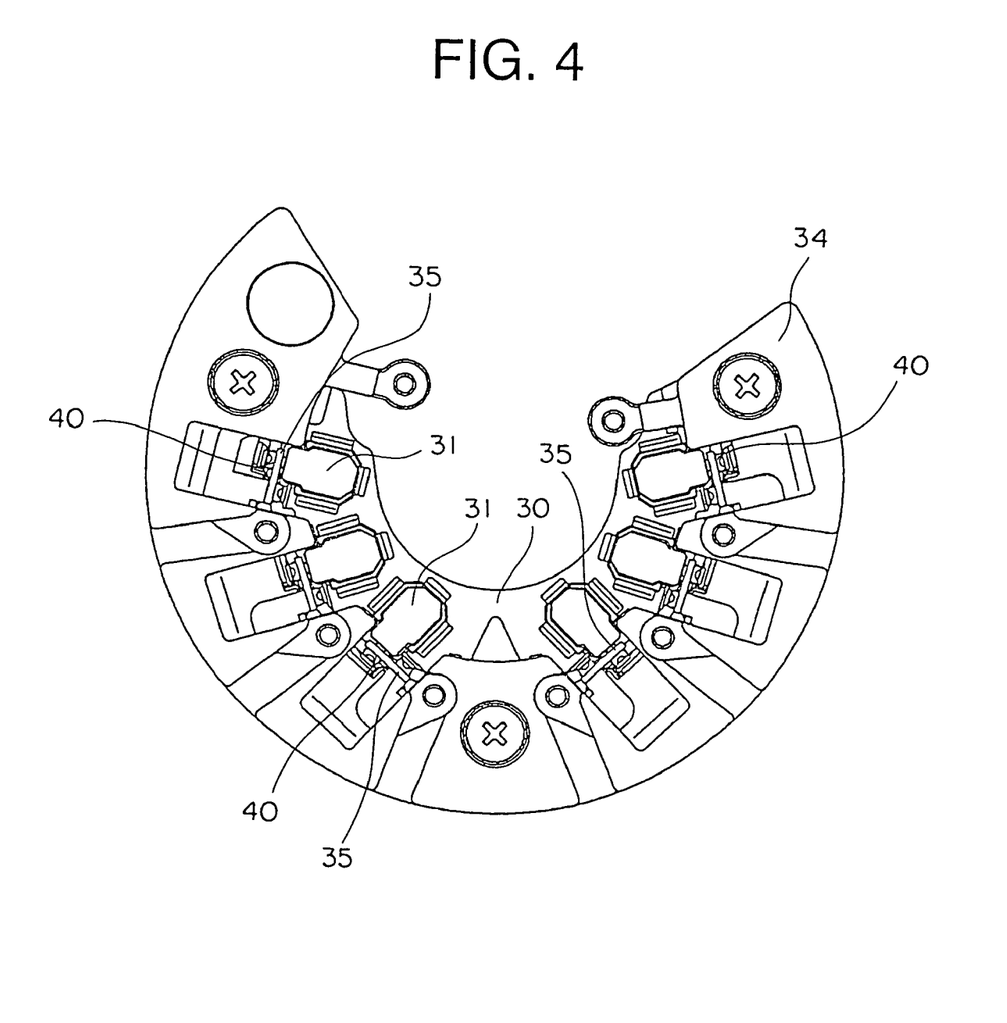
FIG. 4 is a front elevation showing the rectifier from FIG. 1 when viewed from a front end of the automotive alternator.

FIG. 1 is a cross section showing an automotive alternator (hereinafter simply "alternator") according to Embodiment 1 of the present invention, FIG. 2 is an electrical circuit diagram for the alternator in FIG. 1, FIG. 3 is a perspective showing a rotor from FIG. 1, and FIG. 4 is a front elevation showing the rectifier from FIG. 1 when viewed from a front end of the alternator.

In an alternator constituting a dynamoelectric machine, a shaft 5 having a pulley 4 fixed to a first end portion is rotatably disposed inside a case 3 constituted by a front bracket 1 and a rear bracket 2 made of aluminum. A Lundell rotor 6 is fixed to the shaft 5. A stator 9 is fixed to an inner wall surface of the case 3 around the rotor 6 so as to surround the rotor 6.

Slip rings 10 for supplying electric current to the rotor 6 are fixed to a second end portion of the shaft 5. A pair of brushes 11 housed inside a brush holder 12 slide in contact with surfaces of the slip rings 10.

A voltage regulator 13 for adjusting magnitude of alternating voltage generated in the stator 9 is fixed to the brush holder 12. Rectifiers 14 electrically connected to the stator 9 so as to convert alternating current into direct current are also disposed inside the rear bracket 2.

A plurality of front-end suction apertures 1a are formed on a radially-inner side of the front bracket 1 and a plurality of front-end discharge apertures 1b are formed on a radially-outer side. A plurality of rear-end suction apertures 2a are formed on a radially-inner side of the rear bracket 2, and a plurality of rear-end discharge apertures 2b are formed on a radially-outer side.

The above rotor 6 includes: a rotor coil 15 for generating magnetic flux on passage of electric current; a pole core disposed so as to cover the rotor coil 15; a front-end fan 7 fixed to an end surface of the pole core near the pulley 4; and a rear-end fan 8 fixed to an end surface of the pole core away from the pulley 4. The pole core includes a front-end pole core body 16 and a rear-end pole core body 17 magnetized into North-seeking (N) poles and South-seeking (S) poles by the magnetic flux. The front-end pole core body 16 and the rear-end pole core body 17 have front-end claw-shaped magnetic poles 18 and rear-end claw-shaped magnetic poles 19, respectively, that are claw-shaped and intermesh with each other. An annular plate 70 is disposed on an end portion of the front-end fan 7 near the pulley 4. An annular plate 71 is disposed on an end portion of the rear-end fan 8 near the rectifiers 14.

The above stator 9 includes: a stator core 20 through which a rotating magnetic field from the rotor 6 passes; and a stator coil 21 disposed radially inside the stator core 20. A plurality of slots formed so as to extend axially are disposed at a uniform pitch around an entire circumference radially inside the stator core 20, which is configured by stacking steel sheets.

As shown in FIG. 2, the stator coil 21 is constituted by two three-phase alternating-current windings 81 in each of which three winding portions 80 are three-phase wye connected, and the two three-phase alternating-current windings 81 have a phase difference corresponding to an electrical angle of 30 degrees from each other.

The above rectifiers 14 include: a horseshoe-shaped aluminum first heat sink 30; rectangular parallelepipedic first unidirectional conducting element bodies 31 disposed on a front surface of the first heat sink 30 so as to be spaced apart circumferentially; a horseshoe-shaped aluminum second heat sink 32 disposed radially outside the first heat sink 30; rectangular parallelepipedic second unidirectional conducting element bodies 33 disposed on the second heat sink 32 so as to be spaced apart circumferentially; and a horseshoe-shaped circuit board disposed so as to cover the second unidirectional conducting element bodies 33.

A plurality of radiating fins 30a are formed in a radial pattern on a rear surface of the aluminum first heat sink 30. The first unidirectional conducting element bodies 31 are formed by insertion molding diodes using an insulating resin. A portion of a rear surface of the aluminum second heat sink 32 is placed in surface contact with the rear bracket 2. The second unidirectional conducting element bodies 33 are formed by insertion molding diodes using an insulating resin.

The circuit board 34 is formed by insertion molding a plurality of circuit board terminals 35. The first unidirectional conducting element bodies 31 and the second unidirectional conducting element bodies 33 are connected by the circuit board terminals 35 so as to constitute a bridge circuit, and the two rectifiers 14 are connected in parallel. The stator coil 21 and the rectifiers 14 are also connected by the circuit board terminals 35.

As shown in FIG. 1, terminal connection portions 40 formed by connecting the circuit-board terminals 35 with the first terminals 36 of the first unidirectional conducting element bodies 31 and the second terminals 37 of the second unidirectional conducting element bodies 33 are disposed between the rear-end fan 8 and the circuit board 34. The terminal connection portions 40 project outward near the rear-end fan 8.

Lead wire connection portions 50 formed by connecting the circuit-board terminals 35 and the lead wires 38 of the stator coil 21 project outward near the rear-end fan 8.

Figure 5:
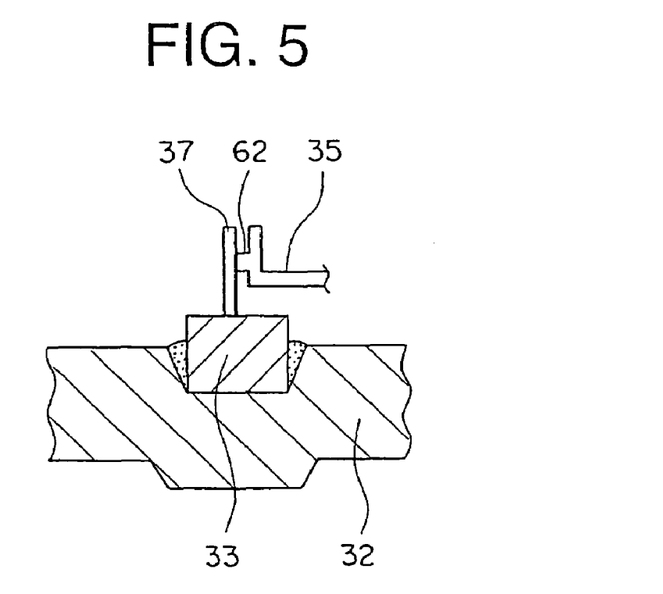
FIG. 5 is a cross section showing a state in which a second unidirectional conducting element body from FIG. 2 is joined to a second heat sink.

FIG. 5 is a cross section showing a state in which the second unidirectional conducting element bodies 33 are fixed to the second heat sink 32.

The rectangular parallelepipedic second unidirectional conducting element bodies 33 are joined to recess portions of the second heat sink 32 by brazing using a solder. The second terminals 37 of the second unidirectional conducting element bodies 33 are connected to the terminals 35 and lugs 62 of the circuit board 34 by resistance welding.

Moreover, although not shown in this figure, the first terminals 36 of the first unidirectional conducting element bodies 31 are also connected to the terminals 35 of the circuit board 34 by resistance welding.

The rectangular parallelepipedic first unidirectional conducting element bodies 31 are joined to recess portions of the first heat sink 30 by brazing using a solder.

In an automotive alternator having the above configuration, electric current is supplied from a battery (not shown) through the brushes 11 and the slip rings 10 to the rotor coil 15, generating a magnetic flux and giving rise to North-seeking (N) poles and South-seeking (S) poles in the front-end and rear-end claw-shaped magnetic poles 18 and 19, respectively.

At the same time, since the pulley 4 is driven by an engine and the rotor 6 is rotated by the shaft 5, a rotating magnetic field is applied to the stator core 20, giving rise to electromotive force in the stator coil 21.

Magnitude of the alternating-current electromotive force is adjusted by the voltage regulator 13, and the alternating-current electromotive force also passes through the rectifiers 14 and is converted into direct current, and the battery is charged.

Due to rotation of the rear-end fan 8 fixed to the end surface of the rotor 6, external air is drawn in near the rear bracket 2 through the rear-end suction apertures 2a, and as indicated by arrow A in FIG. 1, cools the rectifiers 14, then cools the terminal connection portions 40 and coil ends of the stator coil 21, and is then discharged externally through the rear-end discharge apertures 2b. As indicated by arrow B in FIG. 1, external air also cools the voltage regulator 13, then cools the stator coil 21, and is then discharged externally through the rear-end discharge apertures 2b.

As indicated by arrows C and D in FIG. 1, near the front bracket 1, external air is also drawn in through the front-end suction apertures 1a, is deflected centrifugally by the front-end fan 7, cools the coil ends of the stator coil 21, and is discharged externally through the front-end discharge apertures 1b.

In an alternator rectifier according to this embodiment, terminal connection portions 40 configured by connecting the first terminals 36 of the first unidirectional conducting element bodies 31 and the second terminals 37 of the second unidirectional conducting element bodies 33 with the terminals 35 of the circuit board 34 are disposed between the rotor 6 and the circuit board 34. As indicated by arrow A, external air that has entered through the rear-end suction apertures 2a passes through the terminal connection portions 40 and is discharged externally through the rear-end discharge apertures 2b, suppressing temperature increases in the first unidirectional conducting element bodies 31 and the second unidirectional conducting element bodies 33.

Moreover, if terminal connection portions are disposed radially outside a rear-end centrifugal fan, external air deflected centrifugally by the centrifugal fan will strike the terminal connection portions directly, further suppressing temperature increases in first unidirectional conducting element bodies and second unidirectional conducting element bodies.

Welding connection work space for the terminal connection portions 40 can also be increased compared to conventional configurations, improving workability when connecting.

Conventionally, a predetermined amount of space has been required between the circuit board and the first unidirectional conducting element bodies and between the circuit board and the second unidirectional conducting element bodies in order to ensure space for welding operations, but in the case of this embodiment, the need for space for welding operations between the circuit board 34 and the first unidirectional conducting element bodies 31 and between the circuit board 34 and the second unidirectional conducting element bodies 33 is eliminated, enabling axial length of the radiating fins 30*a* to be made proportionately longer.

Since the fans 7 and 8 have the annular plates 70 and 71 fixed to end surfaces of the rotor 6, interference noise arising due to the rotation of the fan 8 resulting from the circuit board 34 having an irregularly shaped surface is reduced by a flow-straightening action of the plate 71 on the rear-end fan 8 facing the circuit board 34.

Because the terminal connection portions 40 are configured by extending axially and connecting the first terminals 36 of the first unidirectional conducting element bodies 31 and the circuit-board terminals 35 and the second terminals 37 of the second unidirectional conducting element bodies 33 and the circuit-board terminals 35, respectively, temperature increases in the first unidirectional conducting element bodies 31 and the second unidirectional conducting element bodies 33 are further suppressed since the terminal connection portions 40 receive more external air flowing radially as can be seen from the arrows A.

Because the horseshoe-shaped second heat sink 32 is disposed radially outside the horseshoe-shaped first heat sink 30, length of the respective terminals 36 and 37 of the first unidirectional conducting element bodies 31 and the second unidirectional conducting element bodies 33 can be made generally equal, enabling the first unidirectional conducting element bodies 31 and the second unidirectional conducting element bodies 33 to be cooled in a well-balanced manner through the terminals 36 and 37.

Because an outer peripheral portion of the second heat sink 32 is in surface contact with the rear bracket 2, heat from the second heat sink 32 is discharged externally through the rear bracket 2 efficiently by thermal conduction.

Because the first heat sink 30 and the second heat sink 32 are made of aluminum, thermal conductivity is higher and cost is lower than for copper, reducing manufacturing costs proportionately.

Because the first unidirectional conducting element bodies 31 are joined to the first heat sink 30 by brazing using a solder, and the second unidirectional conducting element bodies 33 are also joined to the second heat sink 32 by brazing using a solder, heat from the first unidirectional conducting element bodies 31 and the second unidirectional conducting element bodies 33 is smoothly transferred by thermal conduction to the first heat sink 30 and the second heat sink 32, respectively.

Because the terminal connection portions 40 are formed using resistance welding, comparatively inexpensive equipment can be used to perform the welding operations.

Because the lead wire connection portions 50 in which the lead wires 38 of the stator coil 21 and the terminals 35 of the circuit board 34 are connected project outward near the rotor 6, the lead wire connection portions 50 are also cooled by external air that has entered through the rear-end suction apertures 2*a* in a similar manner to the terminal connection portions 40, temperature increases in the first unidirectional conducting element bodies 31 and the second unidirectional conducting element bodies 33, as well as in the stator coil 21, are also suppressed.

Embodiment 2

Figure 6:
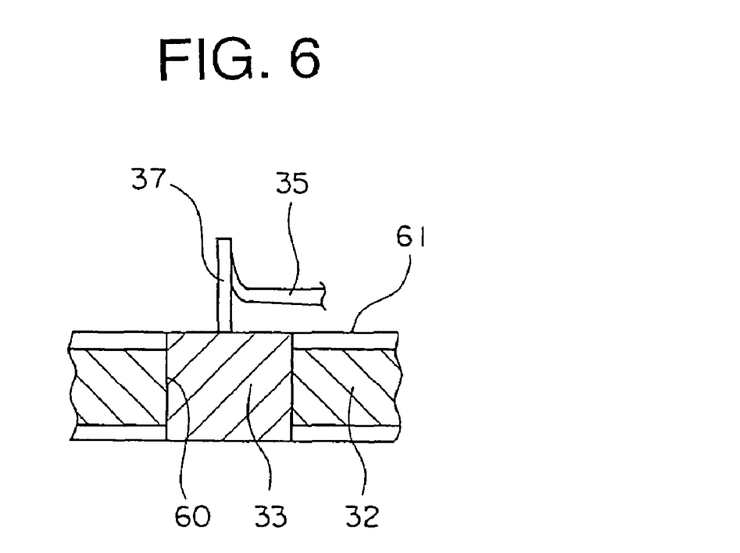
FIG. 6 is a cross section showing a state in which a second unidirectional conducting element body is joined to a second heat sink in a rectifier according to Embodiment 2 of the present invention.

FIG. 6 is a partial cross section showing an alternator according to Embodiment 2 of the present invention.

In this embodiment, first unidirectional conducting element bodies 31 are fitted into penetrating apertures formed on a first heat sink 30 and second unidirectional conducting element bodies 33 are fitted into penetrating apertures 60 formed on a second heat sink 32.

A coating 61 is formed on a surface of the first heat sink 30 and the second heat sink 32 using an epoxy resin.

Terminal connection portions 40 are formed by connection using tungsten-arc inert gas-shielded (TIG) welding.

The rest of the configuration is similar to that of Embodiment 1.

In this embodiment, because the first unidirectional conducting element bodies 31 are fitted into the penetrating apertures formed on the first heat sink 30 and the second unidirectional conducting element bodies 33 are fitted into the penetrating apertures 60 formed on the second heat sink 32, axial dimensions of the rectifiers 14 are shortened, enabling axial length of the radiating fins 30*a* of the first heat sink 30 to be made proportionately longer, enabling temperature increases in the first unidirectional conducting element bodies 31 and the second unidirectional conducting element bodies 33 to be further suppressed.

Because the coating 61 is formed on the surface of the first heat sink 30 and the second heat sink 32 using an epoxy resin, more heat is radiated from the first heat sink 30 and the second heat sink 32.

The inventors of the present invention performed comparative experiments to measure temperature in the first unidirectional conducting element bodies 31 and the second unidirectional conducting element bodies 33 when an alternator is operated in the "presence" and in the "absence", respectively, of the coating 61.

As a result, it was found that the temperature of the first unidirectional conducting element bodies 31 and the second unidirectional conducting element bodies 33 was 102 degrees Celsius when the coating 61 was absent but 97 degrees Celsius when the coating 61 was present, that is, there was a temperature drop of 5 degrees Celsius in the "presence" of the coating 61 compared to when it was "absent".

Since the terminal connection portions 40 are formed by welding using TIG welding, in which a torch can be inserted radially, they can be formed simply without having to dispose lugs 62 on the circuit-board terminals 35 as required in resistance welding.

Moreover, in each of the above embodiments, explanations have been given for automotive alternators, but the present invention can of course also be applied to other alternating-current generators driven to rotate using an internal combustion engine other than a vehicle-mounted engine, or an electric motor, a water wheel, etc., as a driving source.

The heat sinks 30 and 32 are described as being made of aluminum, but of course they are not limited to this material, and may also be made of copper, for example.

The terminal connection portions 40 and the lead wire connection portions 50 may also be crimped, then joined by brazing using a solder.

A solder was used as a brazing filler material to fix the first unidirectional conducting element bodies 31 to the first heat sink 30 and fix the second unidirectional conducting element bodies 33 to the second heat sink 32, but of course the brazing filler material is not limited to solders.

The present invention can of course also be applied to alternator rectifiers in which the first heat sink and the second heat sink are disposed so as to be separated from each other axially, and to alternator rectifiers placed in close contact with each other with an insulating sheet interposed.

The invention claimed is:

1. An alternator comprising:
a case having a suction aperture and a discharge aperture;
a rotor disposed inside said case, said rotor being fixed to a shaft and having a fan disposed on an axial end portion;
a stator disposed so as to surround said rotor, alternating current being generated in said stator by a rotating magnetic field from said rotor; and
a rectifier disposed near an end portion of said shaft, said rectifier rectifying said alternating current generated in said stator,
wherein:
said rectifier includes:
 a first heat sink;
 first unidirectional conducting element bodies disposed on a surface of said first heat sink so as to be spaced apart;
 a second heat sink disposed so as to be separated radially outward from said first heat sink without radially overlapping said first heat sink;
 second unidirectional conducting element bodies disposed on said second heat sink so as to be spaced apart; and
 a circuit board having a circuit-board terminal by which said first unidirectional conducting element bodies and said second unidirectional conducting element bodies are connected so as to constitute a bridge circuit, and
a terminal connection portion, configured by connecting a terminal leading out of said first unidirectional conducting element bodies and a terminal leading out of said second unidirectional conducting element bodies respectively with said circuit board terminal, is disposed between said rotor and said circuit board.

2. The alternator according to claim 1, wherein:
said fan is a centrifugal fan; and
said terminal connection portion is disposed radially outside said centrifugal fan.

3. The alternator according to claim 1, wherein:
said fan has an annular plate disposed on an end portion near said circuit board.

4. The alternator according to claim 1, wherein:
said terminal connection portion is configured by extending axially and connecting said terminal of said first unidirectional conducting element bodies, said terminal of said second unidirectional conducting element bodies and said circuit board terminal respectively.

5. The alternator according to claim 1, wherein:
said first heat sink and said second heat sink each have a horseshoe shape; and
said second heat sink is disposed radially outside said first heat sink.

6. The alternator according to claim 1, wherein:
an outer peripheral portion of said second heat sink is in surface contact with said case.

7. The alternator according to claim 1, wherein:
said first heat sink and said second heat sink are made of aluminum.

8. The alternator according to claim 1, wherein:
a resin coating is formed on a surface of said first heat sink and said second heat sink.

9. The alternator according to claim 1, wherein:
said first unidirectional conducting element bodies are fitted into a penetrating aperture formed on said first heat sink; and
said second unidirectional conducting element bodies are fitted into a penetrating aperture formed on said second heat sink.

10. The alternator according to claim 1, wherein: a lead wire connection portion in which a lead wire of said stator is connected to said circuit board terminal of said circuit board projects outward near said rotor.

\* \* \* \* \*